United States Patent [19]

Boxall

[11] 4,004,109
[45] Jan. 18, 1977

[54] HYBRID CIRCUIT

[76] Inventor: Frank S. Boxall, 380 Eleanor Drive, Woodside, Calif. 94062

[22] Filed: May 9, 1975

[21] Appl. No.: 575,927

[52] U.S. Cl. .................................. 179/170 NC
[51] Int. Cl.² .................................. H04B 1/58
[58] Field of Search .... 179/170 R, 170 D, 170 NC, 179/170 T

[56] References Cited

UNITED STATES PATENTS

| | | | |
|---|---|---|---|
| 2,511,948 | 6/1950 | Wang | 179/170 NC |
| 3,180,947 | 4/1965 | Haselton, Jr. et al. | 179/170 NC |
| 3,530,260 | 9/1970 | Gaunt, Jr. | 179/170 NC |
| 3,700,831 | 10/1972 | Aagaard et al. | 179/170 NC |
| 3,778,563 | 12/1973 | Bise et al. | 179/170 R |
| 3,849,609 | 11/1974 | Voorman | 179/170 NC |
| 3,855,430 | 12/1974 | Colardelle et al. | 179/170 NC |

*Primary Examiner*—Kathleen H. Claffy
*Assistant Examiner*—Randall P. Myers
*Attorney, Agent, or Firm*—Flehr, Hohbach, Test, Albritton & Herbert

[57] ABSTRACT

A direct coupled transformerless hybrid for providing signal conversion between a balanced bidirectional transmission path and a pair of unbalanced unidirectional transmission paths, for providing direct current to the bidirectional transmission path, for suppressing longitudinal mode signals supplied by the bidirectional transmission path, and for providing signal balance to suppress transmission of reflected echoes from the incoming unidirectional transmission path to the outgoing unidirectional transmission path.

Of the several embodiments disclosed each includes a plurality of current mirror circuits, some of which include elements of complementary conductivity type to the elements of the remaining current mirror circuits. Each current mirror circuit has a voltage supply terminal, an input terminal, at least one output terminal, and means for supplying a current to the output terminal proportional to the current at the input terminal.

Means are further provided for automatically adjusting signal balance at the unidirectional transmission path side of the hybrid in accordance with the resistance, and thus the length, of the bidirectional transmision path.

20 Claims, 12 Drawing Figures

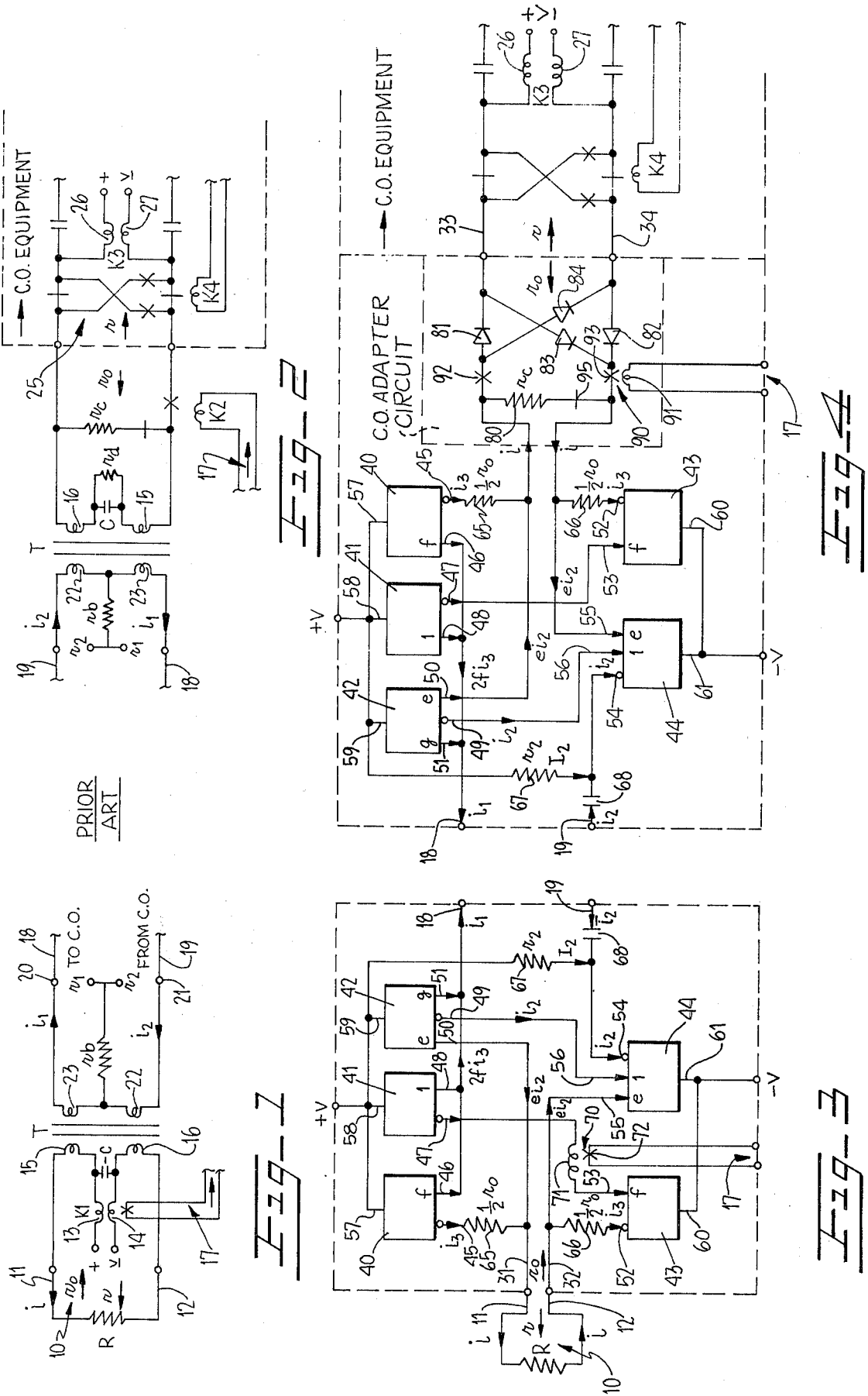

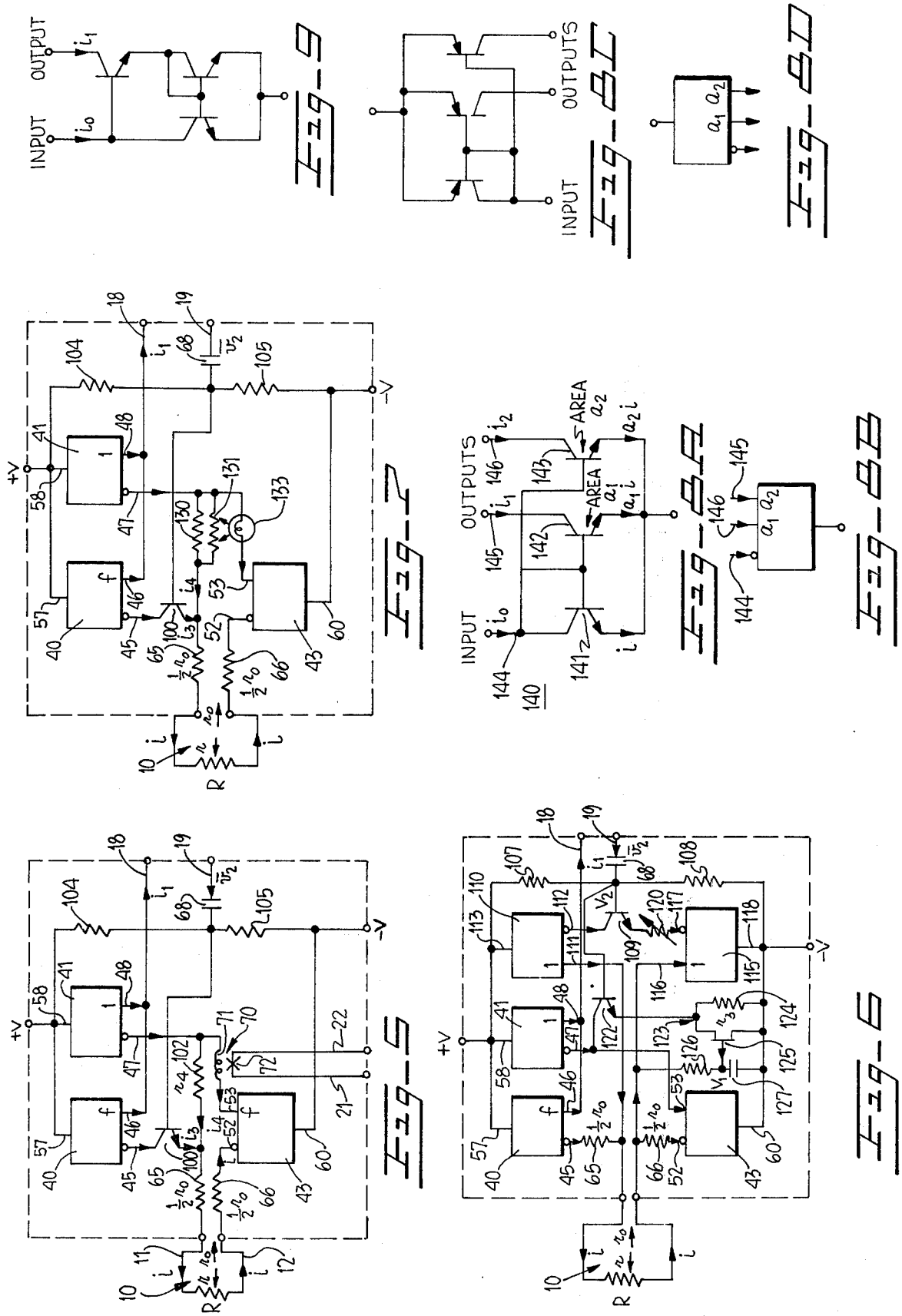

HYBRID CIRCUIT

BACKGROUND OF THE INVENTION

This invention relates to hybrid circuits for providing an interface between a pair of unbalanced unidirectional transmission paths and a balanced two wire, bidirectional transmission path. More particularly, this invention relates to hybrid circuits of such type which are direct coupled, i.e. transformerless.

Hybrid circuits are known for providing signal conversion between a balanced two wire, bidirectional transmission path and a pair of unbalanced unidirectional transmission paths, the latter comprising a first unidirectional transmission path for carrying incoming electrical signals and a second undirectional transmission path for carrying outgoing electrical signals. Such hybrid circuits are typically employed in the telephone art to provide a signal interface between a telephone carrier channel having the aforementioned pair of unidirectional transmission paths and the balanced bidirectional transmission paths at either end of the carrier channel to which are connected the subscriber loop and telephone hand set at one end, and the central office equipment at the other end.

In the past, hybrid circuits have been conventionally implemented by means of transformers having a pair of loop terminals connected to the bidirectional signal loop and two transmission path terminals each connected to a different one of the unidirectional signal paths. The transformer hybrid circuit is typically designed to provide an impedance match with a nominal (i.e., statistically averaged) bidirectional loop at the loop side and also to provide an impedance match with the unidirectional signal paths at the unidirectional transmission path side in order to optimize signal transfer between the bidirectional and the unidirectional signal paths. In addition, known transformer hybrid circuits typically include a balancing impedance network at the unidirectional transmission path side to provide signal balance in order to suppress transmission of reflected echoes from the incoming unidirectional transmission path to the outgoing unidirectional transmission path. Further, the transformer hybrid is typically configured in such a manner that longitudinal mode signals presented to the hybrid loop terminals from the bidirectional loop are suppressed. Longitudinal mode signals are typically generated by adjacent power circuits and power currents in the conductive sheath which surrounds the bidirectional loop conductors and such signals are inductively coupled to the loop conductors. Unless suppressed, these longitudinal mode signals introduce objectionable noise into the information signals, which impairs the performance of the overall system. Transformer type hybrids designed in accordance with the above requirements have been found to provide the desired functional capabilities and thus have been widely used in the telephone industry in the past. However, such hybrids suffer from several inherent disadvantages. Firstly, transformers of the type required to provide minimal adequate performance have a relatively large physical size when compared to other circuit elements and thus introduce constraints on packaging and installation of hybrid units. Further, transformers must be carefully constructed in order to provide adequate longitudinal signal suppression, which increases the manufacturing cost. In addition, transformer type hybrids are typically operated with relatively large D.C. currents flowing in the primary winding of the transformer (for reasons set forth in detail below), and yet must provide adequate frequency response over the bandwidth of the signal transmission system, typically 0.3 –3 KHZ. However, in order to provide adequate low frequency response in the presence of large direct current, a large iron core is required which increases both the physical size and the manufacturing cost of the transformer.

Due to the above-noted limitations inherent in transformer type hybrids, recent efforts in this field have been directed to the design of transformerless hybrids circuits having substantially similar functional capabilities as transformer type hybrids without the attendant limitations. State of the art hybrids of this type, of which the disclosure of U.S. Pat. No. 3,849,609 is representative, employ semiconductor current controlled current sources, hereinafter designated "current mirrors", to convert incoming signals from the unidirectional transmission path to bidirectional transmission path signals, and to convert the signals originating in the bidirectional transmission path to outgoing information signals for the unidirectional transmission path. Circuits of this type possess the decided advantage of being implementable in integrated circuit form, which results in a lower manufacturing cost than that for transformer type hybrids, good reliability, and small physical size. To date, however, efforts to design a direct coupled transformerless hybrid providing signal balance for suppressing transmission of reflected echoes from the incoming unidirectional transmission path to the outgoing unidirectional transmission path, suppression of longitudinal signals originating in the bidirectional transmission path, optimum conversion between balanced signals at the bidirectional transmission path side and unbalanced signals at the unidirectional transmission path side and good low frequency response have not met with wide success.

SUMMARY OF THE INVENTION

The invention comprises a direct coupled transformerless hybrid employing current mirrors which can be manufactured for a relatively low cost, and which is reliable in operation, small in physical size, and provides direct current to the bidirectional transmission path, suppression of longitudinal signals originating in the bidirectional transmission path, signal balance for suppressing reflected echoes, optimum conversion between unbalanced signals at the unidirectional transmission path side and balanced signals at the bidirectional transmission path side, and improved frequency response over the bandwidth of the signal tranmission system in which the hybride is employed.

In the broadest aspect, the invention comprises the use of current mirrors of opposite conductivity types configured in a unique manner to additively combine normal mode signals and subtractively combine longitudinal mode signals originating in a bidirectional transmission path so that the normal mode signals are supplied to an outgoing unidirectional transmission path while the longitudinal mode signals are suppressed. Further, the impedance of the novel hybrid of the invention is matched to that of a nominal bidirectional transmission path to provide good signal transfer characteristics with bidirectional transmission paths having impedances lying in the customarily encounted range to ensure compatability of the invention with existing installations.

Signal balance is provided according to the invention by injecting portions of any signals present on the incoming unidirectional transmission path into the outgoing unidirectional transmission path to cancel signals reflected to the latter. In some embodiments of the invention, means are included for providing automatic adjustment of signal balance with bidirectional transmission paths having a range of resistances, i.e. paths having different lengths.

In those embodiments adapted for use with bidirectional transmission paths comprising the subscriber loop, means are also provided for supplying D.C. current to the subscriber loop and for coupling signals from the bidirectional transmission path to a unidirectional control signal transmission path to enable such control signals to be transmitted to remote central office equipment. In those embodiments adapted for use with bidirectional loops located at the central office equipment, means are also provided for establishing a D.C. current path for enabling operation of a central office equipment relay when a D.C. voltage of either polarity is applied by the central office equipment to the hybrid loop terminals.

For a further understanding of the nature and advantages of the invention, reference should be had to the ensuing detailed description taken in conjection with the accompanying drawings.

BRIEF DESCRIPTION OF THE DRAWINGS

FIG. 1 is a diagram of a known transformer-type hybrid designed for use with a subscriber loop;

FIG. 2 is a diagram of a known transformer type hybrid designed for use with central office equipment;

FIG. 3 is a block diagram of a first embodiment of the invention adapted for use with a subscriber loop;

FIG. 4 is a diagram of a second embodiment of the invention adapted for use with central office equipment;

FIG. 5 is a block diagram of an alternate embodiment of a subscriber loop hybrid according to the invention;

FIG. 6 is a block diagram of another alternate embodiment of a subscriber loop hybrid according to the invention;

FIG. 7 is a diagram of still another alternate embodiment of a subscriber loop hybrid according to the invention;

FIGS. 8A–8D are diagrams illustrating the current mirrors employed in the invention; and, FIG. 9 is a circuit diagram of an alternate current mirror.

DESCRIPTION OF THE PREFERRED EMBODIMENTS

Turning now to the drawings, FIG. 1 shows a typical transformer hybrid for use at the subscriber end of a telephone carrier channel. The bidirectional transmission side connects to a subscriber telset via a balanced pair of conductors 11, 12 termed the subscriber loop and generally designated by reference numeral 10. Resistor R represents the DC resistance of loop 10 plus the telephone handset, while $r$ represents the audio signal impedance thereof. R and $r$ both vary from loop to loop. Loop current $i$, required by the telephone handset, flows from a battery V through the balanced circuit coils 13, 14 of a relay K1 and the split primary winding 15, 16 of a transformer T. The combined resistance of coils 13, 14 and winding 15, 16 is typically 400 ohms. With V=50 volts and R=200 ohms (the latter a typical value of the resistance of a conventional telephone handset), the loop current $i$ is 83 ma. The transformer T must provide good low frequency response with this large direct current in primary winding 15, 16. Typical minimum values for V and $i$ are 46 volts and 23 ma. which limit R to 1600 ohms maximum (the telephone handset plus a 1400 ohm loop).

Relay K1 is operated by the loop current $i$, and is released for telephone handset on-hook and by the break-pulses of the telephone handset dial runback. The K1 contact repeats hook-state and dial-breaks into an outgoing signalling path 17 of the carrier channel. A condenser C provides a low impendance path across K1 for audio signals.

The other side of transformer T connects to the two unidirectional transmission paths 18, 19 of the carrier channel. Port 20 is connected to the outgoing path 18 to the central office (C.O.) end, and $r_1$ is the input impedance of path 18. Port 21 is connected to the incoming path 19 from the C.O. end, and $r_2$ is the output impedance of path 19. The transformer T matches the carrier impedances $r_1, r_2$ to a standard impedance $r_o$ which is the nominal value of $r$, i.e. the statistical average impedance of a plurality of loops 10. Conventionally, $r_o$ =900 ohms. Impedance $r_b$ is the signal balance impedance which isolates the outgoing carrier port from the incoming port.

The hybrid operates as follows. Speech at the telephone handset transmitter superimposes an audio signal on loop current $i$ which induces signal currents in carrier ports 20 and 21. Signal $i_1$ is transmitted to the C.O. end. The signal at port 21 is dissipated in impedance $r_2$. Incoming audio signals from the C.O. end generate signal current $i_2$ which flows through winding 22 and impedance $r_b$. The signal in winding 22 superimposes a signal on $i$ which activates the telephone handset receiver. No signal flows to port 20 because the voltage drop across $r_b$ and the voltage induced in winding 23 are equal and opposite.

The signal balance is complete only if the audio signal impedance $r$ of the loop is equal to the nominal value $r_0$. In practice, $r$ varies from loop to loop and the signal balance is incomplete, so that a fraction of the incoming signal enters port 20 and is returned to the C.O. end as a "reflected echo." The reflected signal at port 20 can be expressed in terms of an equivalent current $i_r$ reflected from loop 10 to the hybrid. Thus, $i_r = \rho \, i_m$ is the current which would be delivered to a matched loop 10 (i.e., one in which $r=r_0$), and $\rho = (r-r_0)/(r+r_0)$ is the reflection coefficient of loop 10 as seen from the hybrid.

The hybrid also provides balance against longitudinal signals, also known as common mode signals, induced in the loop conductors 11, 12. For well balanced loops the two longitudinal voltages are equal, in-phase, and opposing, so that no longitudinal current circulates around the loop 10. However, a longitudinal current can flow from loop conductors 11, 12 to the positive and negative terminals of battery V via winding 15 and coil 13 and winding 16 and coil 14, respectively. These two currents cancel in the transformer primary winding 15, 16 and do not enter the carrier channel. It should be noted that longer loops have greater exposure to longitudinal induction than shorter loops.

FIG. 2 shows a typical transformer hybrid for use at the central office end of a carrier channel. Impedance $r$ is the audio signal impedance of the bidirectional path 25 in the C.O. The operation for audio signals is as previously described above for the hybrid of FIG. 1. Relay K2 repeats the hook-state and dial-breaks from the incoming signalling path 17 of the carrier channel. Resistor $r_d$ provides a DC path through the transformer split primary winding 15, 16, and condenser C is a low impedance bypass for audio signals. When K2 operates, current flows from C.O. battery V through the hybrid and the balanced coils 26, 27 of relay K3. With K2 released, resistor $r_0$ provides an "idle circuit termination" which balances the C.O. hybrid to prevent round trip oscillations of the carrier channel. Under certain circumstances the polarity of the current supplied from K3 is reversed by the C.O. equipment. This possibility is indicated by the polarity reversing contacts of a relay K4 having a coil operated by known control circuitry in the C.O. equipment.

It should be noted that FIGS. 1 an 2 do not show the circuit elements for ringing the telephone handset in subscriber loop 10. However, since the hybrids are not directly involved in this function, these elements have been omitted to avoid prolixity.

FIG. 3 illustrates a first embodiment of a hybrid according to the invention for use with a subscriber loop 10. As seen in this FIG., the hybrid includes a plurality of current mirror circuits 40–42 fabricated from semiconductors of a first conductivity type and shown in detail in FIG. 8C, and a plurality of current mirror circuits 43, 44 fabricated from semiconductors of an opposite conductivity type and shown in detail in FIG. 8A. As described more fully below in connection with the description of FIGS. 8A–D, each current mirror circuit has an input terminal designated by a small circle as shown, one or more output terminals which can be identified by an alphanumeric character adjacent thereto, and a terminal connected to a suitable voltage source, e.g. a D.C. power supply. Each current mirror functions in such a manner that the current present at the output terminal thereof is proportional to the input current present on the input terminal, this proportionality being designated by the alphanumeric character which may be an intergral, fractional or irrational numeric quantity. For example, with the current present at input terminal 45 of current mirror 40 represented by $i_3$, the output current present on output terminal 46 equals $fi_3$, where $f$ is a predetermined numerical quantity. Similarly, with current $i_2$ present at the input terminal 49 of current mirror 42, the current present on output terminal 50 equals $ei_2$, while the current present on output terminal 51 equals $gi_2$, where $e$ and $g$ are both predetermined numerical quantities. The sense of the arrow adjacent the input terminal circle indicates the direction of current flow through a given current mirror circuit, and thus the conductivity type of the semiconductor material employed therein; with an arrow pointing away from the input terminal designating PNP type material and an arrow pointing toward the input terminal designating NPN type material. For example, in FIG. 3 current mirrors 40, 41 nd 42 all employ PNP type semiconductors, while current mirrors 43 and 44 employ NPN type semiconductors. These conventions are used throughout the FIGS.

The supply voltage input terminals 57–59 of current mirrors 40–42, respectively, are all connected to first supply voltage source +V, which may be the positive terminal of the power supply noted above. The input terminal 45 of current mirror 40 is connected to first loop terminal 31 via a resistance 65, while first output terminal 50 of current mirror 42 is connected directly to first loop terminal 31. Similarly, the input terminal 52 of current mirror 43 is connected to second loop terminal 32 via a resistance 66, while first output terminal 55 of current mirror 44 is connected directly to second loop terminal 32. Each resistance 65, 66 has an impedance $r_0/2$, where $r_0$ is the impedance seen at terminals 31, 32 by loop 10 and is the nominal impedance noted above.

Input terminal 49 of current mirror 42 is connected to the second output terminal of current mirror 44, while input terminal 54 of current mirror 44 is connected to first supply voltage source +V via resistance 67, and is AC coupled to unidirectional transmission path 19 via a capacitor 68.

Output terminal 46 of current mirror 40 is connected to path 18 along with output terminal 48 of current mirror 41 and output terminal 51 of current mirror 42.

The input terminal 47 of current mirror 41 is connected via a coil 71 of a conventional signaling relay 70 to the output terminal 53 of current mirror 43. Coil 71 controls the state of normally opened relay contacts 72 which are connected to outgoing signaling path 17.

The supply voltage input terminals 60, 61 of current mirrors 43, 44 respectively, are connected to a second supply voltage −V which may be the negative terminal of the power supply noted above.

In the ensuing discussion, $i$, $i_1$, $i_2$, $i_3$ each represents total current, i.e. both the DC and signal current components, while the DC and signal current components are represented respectively by an upper case I and a lowwer case $\bar{i}$ with overbar. For example, $i_2 = I_2 + \bar{i}_2$ signifies that the total current $i_2$ equals the sum of the DC component $I_2$ and the signal component $\bar{i}_2$.

The loop current $i$ consists of two components viz. $i_3$ and $ei_2$. Current component $i_3$ is supplied via input terminals 45, 52 of current mirrors 40, 43 and matched series resistors 65, 66, each having an impedance $r_0/2$. Current component $ei_2$ is supplied via output terminals 50, 55 of current mirrors 42, 44 ech having an imput current $i_2$. Current component $i_2$ comprises $I_2$ which flows through resistance 67 having a resistance $r_2$ and $\bar{i}_2$ which is supplied from incoming undirectional transmission path 19 via capacitor 68.

Current mirror 41 reverses the current $fi_3$ flowing in output terminal 53 of current mirror 43. Since output terminals 46, 48 of current mirrors 40, 41 are connected together, the resulting algebraic sum of the respective output currents cancels any longitudinal signals originating in loop 10. More specifically, equal longitudinal currents in loop conductors 11, 12 alter the current on input terminals 45, 52 of current mirrors 40, 43, respectively, in opposite directions. The resulting variation of current at output terminals 46, 53 of current mirrors 40, 43 are also in opposite directions and are consequently cancelled in the current sum $2fi_3$. As noted above, the current present on output terminals 46, 48 of current mirrors 40, 41 is algebraically summed with the current present on output terminal 51 of current mirror 42, and this sum is connected to outgoing unidirectional path 18. Thus, the current designated $i_1$ comprises the algebraic sum of $2fi_3 + gi_2$ and comprises the total current output supplied to path 18.

For the DC analysis of the circuit of FIG. 3, the voltage drop across current mirrors 10, 43 between the supply voltage input terminal and the current input terminal is assumed to be 1 volt DC. Accordingly, $$IR + I_3 r_0 = v - 2 \qquad \qquad 1.$$

and  $I = I_3 + eI_2$ (2)

and  $I_2 = \dfrac{V - 1}{r_2}$ (3)

$$I = \dfrac{(V - 2) + (V - 1)\dfrac{er_0}{r_2}}{R + r_0}$$ (4)

where $R$ is the D.C. resistance of loop 10.

A representative requirement for the maximum sinusoidal signal power to a matched loop (viz. one in which $r=r_0$) is +10dBm (10 milliwatts). For nominal loop impedance $r_0 = 900$ ohms, the corresponding signal currents are $\bar{i}=4.7$ ma. peak, $\bar{i}_3=4.7$ ma. peak, and $e\bar{i}_2=9.4$ ma. peak. Therefore, $eI_2$ must exceed 9.4 ma. Choosing $r_2=3e$ K ohm, provides $eI_2=16$ ma. for V32 50 volts.

Using these values of $r_0$ and $r_2$ and the values V=50 volts and R=200 ohms (the extreme short loop case parameters used in the discussion of FIG. 1 supra) I=57 ma. and $I_3$=41 ma. For V=46 volts and R=1600 ohms (the limiting long loop case parameters supra) =23 ma. and $I_3$=8 ma. Comparing these results with those obtained for the transformer type hybride of FIG. 1, it is seen that the hybrid of FIG. 3 supplies lower currents to short loops (R=200 ohms) than the transformer-type hybrid and has the same long loop capability as the transformer type hybrid. It whould be noted that the maximum signal which can be balanced with the hybrid of FIG. 3 connected to a loop 10 of maximum length is 8 ma. peak in the absence of any other signals. In the presence of other signals, this maximum value is less. Thus, use of the FIG. 3 hybrid with long loops 10 having relatively large longitudinal currents should preferably be avoided.

For signal analysis, the DC resistance R is replaced by the signal impedance $r$ of loop 10. Information signals from loop 10 supply current $\bar{i}$ to total loop current $i$, but do not vary $i_2$. Thus $\bar{i}_3 = \bar{i}$, and the output signal present on terminal 18 is $$\bar{i}_1 = 2\bar{f}\bar{i}$$ (5)

An incoming signal $i_2$ on terminal 19 provides signal to the loop $$\bar{i} = \dfrac{r_0}{r + r_0} e\bar{i}_2$$ (6)

and also provides a signal current to current mirrors 40, 43

$$\bar{i}_3 = \dfrac{-r}{r + r_0} e\bar{i}_2$$ (7)

The reflected echo from carrier terminal 19 to carrier terminal 18 is $$\bar{i}_{1r} = 2f\bar{i}_3 + g\bar{i}_2 = \left(g - \dfrac{2ef r}{r + r_0}\right)\bar{i}_2$$ (8)

Setting $g$ to $ef$, $$\bar{i}_{1r} = \left(1 - \dfrac{2r}{r + r_0}\right)g\bar{i}_2 = -\left(\dfrac{r - r_0}{r + r_0}\right)g\bar{i}_2$$ (9)

It is useful to compare this result to the result obtained from conventional reflection theory. According to conventional theory, loop current is expressed as $\bar{i}=\bar{i}_m-\bar{i}_r$, where $\bar{i}_m$ is the signal which would be delivered to a matched loop ($r=r_0$), $\bar{i}_r$ is the current reflected from loop to source (hybride), and $\bar{i}_r/\bar{i}_m=\rho=(r-r_0)(r+r_0)$ is the reflection coefficient. Thus, the results are identical.

To confirm this result, form equation (6) above, $\bar{i}_m=(e/2)\bar{i}_2$. Current $\bar{i}_r$ flows in the opposite direction to $\bar{i}$ of equation (5), so $\bar{i}_{1r}=-2f\bar{i}_i=-2f\rho\bar{i}_m=-2f\rho\bar{i}_2=\rho g\bar{i}_2$, which is the identical result to that obtained in equation (9).

Thus, the hybrid of FIG. 3 has the same reflection coefficient as that of the conventional transformer hybrid of FIG. 1.

In the FIG. 3 hybrid, signal control functions are accomplished by relay 70 connected in the manner noted above between current mirrors 41, 43. Relay 70 is operated when the telephone receiver is removed from the hook switch, is released when the telephone receiver is replaced on the hook switch and is also repeatedly operated and released by dial break signals generated in response to manual operation of the telephone dial. Hook state and idal breaks are thus indicated by the state of contacts 72 and this control signal informationis coupled to the outgoing signaling path 17 for transmission to the central office equipment.

It should be noted that other equivalent control signal circuits may be employed in the hybrid of FIG. 3 if desired, according to the requirements of a particulr application. For example, relay 70 may be replced by a series resistor between terminals 47, 53 of current mirrors 41, 43 to provide a DC voltage representative of hook state and dial breaks. Alternatively, since the DC level of total current $i_1$ contains such signaling information, outgoing unidirectional transmission path 18 may be used to transmit DC currents for conrol signal purposes. Other suitable equivalent arrangements will occur to those skilled in the art.

FIG. 4 illustrates a second embodiment of a hybrid according to the invention for use at the central office equipment end of paths 18, 19. As shown in this figure, the configuration of this hybrid is substantially identical to that of the hybrid shown in FIG. 3. Additionally, the hybrid of FIG. 4 includes a conventional idle circuit termination resistance 80 having an impedance $r_e$ which functions to prevent roundtrip oscillations in the carrier channel. Further, the hybrid of FIG. 4 includes four diodes 81–84 coupled as shown to input terminals 33, 34 of the central office equipment to maintain the direction of current $i$ as indicated by the arrows regardless of the direction of the current at terminals 33, 34, which can be reversed as noted above under certain known modes of operation by central office equipment relay K4.

The control signal elements of the hybrid of FIG. 4 are arranged in a somewhat different fashion from that of the hybrid of FIG. 3. A relay 90 having a coil 91 coupled to signalling path 17 is provided with normally opened contacts 92, 93 for coupling the current mirror circuitry to the loop terminals in response to the appearance of the appropriate control signal on path 17, and is further provided with normally closed contacts 95 for concurrently decoupling idle circuit termination resistance 80.

In FIG. 4, the four diodes, the idle circuit termination resistance, and the coil and contacts of the signaling relay are all enclosed within a dotted box and labeled "C.O. ADAPTER CIRCUIT."

In the embodiments of FIGS. 3 and 4, the hybrid gain from the bidirectional loop to the outgoing signal terminals is $2f$, the hybrid gain from the incoming terminal to the bidirectional loop is $e/2$ and the condition for signal balance is simply $g=ef$. It should also be noted that a pair of hybrids may be coupled back to back. In such a configuration, the loop-to-loop gain is simply g. Representative numerical values for the current mirror circuits used in hybrids according to the invention are $e=2$, $f=\frac{1}{2}$ and $g=1$.

FIG. 5 shows an alternate embodiment of the hybrid of FIG. 3 employing only three mirrors 40, 41 and 43, and thus a correspondingly reduced number of circuit components, but affording similar functional performance for short loops 10. In this embodiment, the collector-emitter circuit of a transistor 100 is inserted between input terminal 45 of current mirror 40 and resistance 65, and the common circuit path between input terminal 47 of current mirror 41 and output terminal 53 of current mirror 43 is connected via a resistance 102 having a resistance $r_4$ to the junction of the emitter of transistor 100 and resistance 65.

Resistance 102 may be connected to resistance 65 either directly as depicted, or coupled through a DC blocking capacitor if desired. In addition, capacitor 68 is coupled between terminal 19 and the base of transistor 100, which is biased by a voltage dividing network comprising pair of biasing resistors 104, 105 connected between supply voltages $+V$ and $-V$.

Since the emitter of transistor 100 is a low impedance point, the impedance at the loop terminals is equal to the combined resistance of elements 65, 66, viz. $r_0$. The loop current is $i=i_3+i_4$, where $i_3$ flows through transistor 100 and current mirror 40, $i$ flows through current mirror 43 and a total current of $fi+i_4$ flows through current mirror 41.

The output signal to the terminal 18, $i_1=f(i+i_3)+i_4$ Since the emitter of transistor 100 exhibits low impedance, longitudinal currents in loop conductors 11, 12 cause a variation in the currents $i$ and $i_3$ in opposite directions, while current $i_4$ is substantially unaffected. Thus, such longitudinal currents are cancelled in $i_1$ and the circuit provides longitudinal balance.

The signal balance conditions are as follows: For a signal $\bar{i}$ originating in loop 10, $\bar{i}_3=\bar{i}$ and $\bar{i}_1=2f\bar{i}$. It is noted that $i_4$ does not vary in response to a loop signal $i$. For an incoming signal $\bar{v}_2$ from path 19, the signal delivered to loop 10 is $\bar{i}=\bar{v}_2/(r+r_0)$, the signal through $r_4$ is $\bar{i}_4=-\bar{v}_2/r_4$, and $\bar{i}_3=\bar{i}-\bar{i}_4$. The reflected echo is $$\bar{i}_{1r} = f(2\bar{i}-\bar{i}_4)+\bar{i}_4 = 2f\bar{i}+(1-f)\bar{i}_4 = \left(\frac{2f}{r+r_0}-\frac{1-f}{r_4}\right)\bar{v}_2 \quad (10)$$

Thus, for signal balance when $r=r_0$, $r_4$ must be equal to $(1-f/f)r_0$ and $f$ must be less than 1. A small value of $f$ is desirable in order to reduce the total current consumption of the circuit of FIG. 4 and also to maintain $i_3$ close to $i$ in order to provide optimum longitudinal balance capability.

It should be noted that the voltage drop across transistor 100 is substantial. For example, with $r_0=900$ ohms and a maximum signal requirement of 10 milliwatts to a matched loop, the signal swing on the base of transistor 100 is 8.5 volts peak. For $r_0=600$ ohms and 4 milliwatts maximum signal, the base signal swing is 4.4 volts peak. Due to the additional voltage drop across transistor 100, and the fact that all of the loop current $i$ flows through $r_0$, the hybrid of FIG. 5 does not enjoy the long loop capability of the embodiment of FIGS. 3 and 4 but is suitable for shorter loops.

It is further noted that the control signal elements 70–72 of the FIG. 5 embodiment are substantially identical to those of the FIG. 3 embodiment and function substantially the same manner. Further, the same equivalent control signal elements may be employed, as desired.

The hybrid of FIG. 5 may also be applied at the central office end of a subscriber carrier channel. In this case the control signal elements 70–72 are omitted, and the central office adapter circuit shown in FIG. 4 is connected between the two-wire side of the hybrid and the central office equipment.

FIG. 6 shows a modification of the hybrid circuit of FIG. 3 which is provided with circuitry for enabling adjustment of the signal gain between incoming unidirectional transmission path 19 and bidirectional loop 10 and also for enabling automatic adjustment of signal balance versus loop length. In this embodiment, current mirrors 40, 41 and 43 function in a manner substantially identical to that described above in connection with FIG. 3, while the remaining circuit elements operate in the following manner.

Resistance 107, 108 provide a DC bias level for the base of transistor 109. Transistor 109 drives a pair of current mirrors 110, 115 which provide a portion of the DC loop current I and all of the AC loop current $\bar{i}$. The signal gain between the incoming carrier signal $\bar{v}$ on terminal 19 and the loop terminals may be adjusted by varying the resistance $r_2$ of resistor 120 connected between the emitter of transmitter 109 and the input terminal 117 of current mirror 115. Signal balance is controlled by transistor 122 having a collector connected to the input terminal 47 of current mirror 41, a base connected to the base of transistor 109, and an emitter connected to supply voltage $-V$ via a resistance network $r_3$ generally designated by reference numeral 123. Resistance network 123 comprises a fixed resistance 124 and a field effect transistor 125.

For the embodiment of FIG. 6, the portion of the incoming signal on path 19 which is reflected to outgoing path 18 is $$\bar{i}_{1r} = \left[ \frac{1}{r_3} - \frac{2f}{r_2} \left( \frac{r}{r+r_0} \right) \right] \bar{v}_2 \qquad (11)$$

for $r=r_0$, the requirement for signal balance is $r_3=r_2/f$. For a short bidirectional loop 10, $r$ is less than $r_0$ and the signal balance is improved by increasing $r_3$. Impedance $r_3$ is the parallel combination of fixed resistance 124 and the source-drain path of field effect transsistor 125. The gate of field effect transistor 125 is biased by a voltage $V_1$ which is derived from the voltage at the lower loop terminal. Fixed resistance 126 and a capacitor 127 are coupled between the lower loop terminal and supply voltage $-V$ in order to provide a low pass filter for removing signal and power components from biasing voltage $V_1$. Thus, in a short bidirectional loop 10, $V_1$ is more positive, which increases resistance $r_3$ to improve signal balance.

If desired, variable resistance 120 may be replaced by an arrangement similar to variable resistance 123 to automatically compensate for increased transmission loss with increased loop length.

The hybrid of FIG. 6 may also be applied at the central office end of a subscriber carrier channel. In this case the central office adapter circuit shown in FIG. 4 is connected between the two-wire side of the hybrid and the central office equipment. Also in this case, $r_3$ would be provided as a fixed or adjustable resistance, while the elements 125, 126 and 127 can be omitted.

FIG. 7 shows an alternate embodiment of the embodiment shown in the FIG. 5 which also includes means for automatically adjusting signal balance with variation in loop length. In this embodiment, resistance 102 is replaced by a parallel resistance network comprising a fixed resistance 130 and a photoresistance 131 whose resistance varies in a predetermined manner with the intensity of light radiation emitted by a light source 133 connected between input terminal 47 of current mirror 41 and output terminal 53 of current mirror 43.

The equation for balance condition is stated supra (equation 10). For a short bidirectional loop 10, the balance is improved by decreasing the value of resistance $r_4$ (comprising elements 130, 131) from a nominal value. Thus, for a short bidirectional loop 10, the loop current $i$ and consequently the current through lamp 133 is greater, which results in increased illumination of photoresistance 131, thereby decreasing the resistance thereof. It should be noted that the thermal time constant of light source 133 should be sufficiently great to prevent audio frequency variations in the current therethrough from substantially affecting the intensity of the radiation emitted thereby.

For clarity, the FIG. 6 and 7 embodiments are depicted without signaling relay 70 or the functional equivalents discussed above. It is understood that both the embodiments of FIG. 6 and 7 may include the circuit elements required to provide this control signal function.

FIG. 8A shows a circuit diagram of a NPN type current mirror 140. As shown in this FIG., current mirror 140 comprises a diode-connected input transistor 141, which provides a relatively low input impedance, and a plurality of output transistors 142, 143 having the bases connected to the base of input transistor 141 and the emitters coupled to supply voltage $-V$ together with the emitter of transistor 141. Since the collector current of transistors 142, 143 is independent of collector volage, these elements provide relatively high output impedance.

In operation, since transistors 141-143 have the same base-emitter voltage, the emitter currents are proportional to the areas of the respective base-emitter junctions. Ignoring small base currents, $i_0=i$, $i_1=a_1i=a_1i_0$, $i_2=a_2i=a_2i_0$ where $a_1,a_2$ are the areas of the base-emitter junctions of the transistors 142 and 143, respectively.

It should be noted that current mirror 140 operates as described only if the instantaneous input current is in the direction indicated and the output voltage does not saturate the output transistors 142, 143.

FIG. 8B illustrates the equivalent symbolic diagram for current mirror circuit 140 of FIG. 8A. Input terminal 144 is designated by a small circle adjacent the peripheral outline while output terminals 145, 146 may be identified by areal characters $a_1$, $a_2$.

FIGS. 8C and 8D illustrate, respectively, the circuit diagram of a PNP current mirror circuit and the symbolic equivalent employed in this disclosure, respectively.

In some applications, it may be desired to utilize a current mirror circuit having a single output terminal and in which the output current is more precisely related to the input current than the current mirror circuits illustrated in FIG. 8. In such applications, a current mirror circuit of the type illustrated in FIG. 9 for NPN type semiconductor material may be employed. In this embodiment, the input current $i_0$ and the output current $i_1$ differ only by the difference in their respective base currents. The input impedance of the FIG. 8 circuit is that of two diodes in series.

The several transistors of the FIG. 8 and FIG. 9 embodiments can be preferably fabricated by simultaneous diffusion into a single monolithic semiconductor substrate, and therefor can be very closely matched.

As will now be apparent, hybrid circuits constructed in accordance with the teachings of the invention provide functional capabilities similar to those of transformer-type hybrid circuits without the above-noted disadvantages. As will be apparent to those skilled in the art, such circuits can be fabricated at a lower cost than transformer hybrids and are much smaller in physical size.

While the above provides a full and complete disclosure of the preferred embodiments of the invention, various modifications alternate constructions and equivalents may be employed without departing from the true spirit and scope of the invention. Therefore, the above description and illustrations should not be construed as limiting the scope of the invention which is defined by the appended claims.

What is claimed is:

1. A direct coupled hybrid circuit for providing signal conversion between a balanced bidirectional transmission path and a pair of unbalanced unidirectional transmission paths, said hybrid circuit comprising:
    loop terminal means adapted to be coupled to said bidirectional transmission path;
    first and second unidirectional terminal means each adapted to be coupled to a different one of said pair of unidirectional transmission paths; and
    a plurality of current mirror circuit means coupled to said loop terminal means and said first and second terminal means said plurality of current mirror circuit means including current mirror circuits for coupling balanced signals appearing on said loop terminal means to said second unidirectional terminal means and current mirror circuits for coupling incoming signals on said first unidirectional terminal means to said loop terminal means, said plurality of current mirror circuit means interconnected so that they suppress longitudinal mode signals appearing on said loop terminal means, and provide signal balance to suppress transmission of reflected echo signals from said first unidirectional terminal means to said second unidirectional terminal means.

2. The combination of claim 1 wherein said hybrid circuit further includes control signal terminal means, and means for coupling control signals originating in said bidirectional transmission path to said control signal terminal means.

3. The combination of claim 1 wherein said current mirror circuit means further includes means for adjusting the signal gain between said first unidirectional terminal means and said loop terminal means.

4. The combination of claim 1 wherein said means for providing signal balance includes means responsive to the resistance of said bidirectional transmission path for adjusting said suppressing means in accordance therewith.

5. The combination of claim 1 wherein said hybrid circuit further includes a plurality of unidirectional conducting devices coupled to said loop terminal means and said current mirror circuit means for maintaning current flow through said terminal means unidirectional.

6. The combination of claim 1 wherein at least two of said plurality of current mirror circuit means include semiconductive elements of opposite conductivity type.

7. A direct coupled hybrid circuit for providing signal conversion between a balanced bidirectional transmission path and a pair of unbalanced unidirectional transmission paths, said pair including an incoming and an outgoing transmission path, said hybrid circuit comprising:

first and second loop terminals adapted to be coupled to said bidirectional transmission path;

first and second unidirectional terminals adapted to be coupled to said incoming and said outgoing unidirectional transmission paths, respectively;

a first plurality of current mirror circuit means each having circuit elements of a first conductivity type;

a second plurality of current mirror circuit means each having elements of an opposite conductivity type;

each of said current mirror circuit means having an input terminal, at least one output terminal, a supply voltage terminal and means for supplying a current to said at least one output terminal proportional to the current at said input terminal;

the input terminal of a first one of said first and second plurality of current mirror circuit means being coupled to said first and second loop terminals, respectively, via first and second resistance elements;

the output terminals of each of said first plurality of current mirror circuit means being coupled to said second unidirectional terminal;

the input terminal of a second one of said first plurality of current mirror circuit means being coupled to the output terminal of said first one of said second plurality of current mirror circuit means;

the input terminal of a second one of said second plurality of current mirror circuit means being coupled to said first unidirectional signal terminal;

a first output terminal of said second one of said second plurality of current mirror circuit means being coupled to said second loop terminal;

a second output terminal of said second one of said second plurality of current mirror circuit means being coupled to the input terminal of a third one of said first plurality of current mirror circuit means; and a second output terminal of said third one of said first plurality of current mirror circuit means being coupled to said first loop input terminal.

8. The combination of claim 7 further including first and second control signal terminals, and control signal transfer means coupled to said input terminal of said second one of said first plurality of current mirror circuit means, said output terminal of said first one of said second plurality of current mirror circuit means, and to said first and second control signal terminals for enabling transfer of control signals from said loop terminals to said first and second control signal terminals.

9. The combination of claim 7 further including a plurality of unidirectional conducting devices coupled to said first and second loop terminals and said first and second resistance elements for maintaining current flow through said loop terminals unidirectional.

10. A direct coupled hybrid circuit for providing signal conversion between a balanced bidirectional transmission path and a pair of unbalanced unidirectional transmission paths, said pair including an incoming and an outgoing path, said hybrid circuit comprising:

first and second bidirectional loop terminals;

first and second unidirectional terminals;

first and second current mirror circuit means having circuit elements of a first conductivity type;

third current mirror circuit means having elements of an opposite conductivity type;

each of said current mirror circuit means having an input terminal, an output terminal, a supply voltage terminal and means for supplying current to said output terminal proportional to the current at said input terminal;

a transistor of said first conductivity type having a collector coupled to the input terminal of said first current mirror circuit means of said first conductivity type, an emitter coupled to a first terminal of a first resistance element, and a base coupled to said first unidirectional terminal;

the input terminal of said third current mirror circuit means of said opposite conductivity type being coupled to a first terminal of a second resistance element;

a second terminal of said first and second resistance elements being coupled respectively to said first and second loop terminals;

the input terminal of said second current mirror circuit means of said first conductivity type being coupled to the output terminal of said third mirror circuit means of said opposite conductivity type;

a third resistance element having a first terminal coupled to the input terminal of said second current mirror circuit means of said first conductivity type, and a second terminal coupled to said emitter of said transistor;

the output terminals of said first and second current mirror circuit means of said first conductivity type being coupled to said second unidirectional terminal.

11. The combination of claim 10 further including first and second control signal terminals, and control signal transfer means coupled to said input terminal of said second one of said first conductivity type current mirror circuit means, said output terminal of said opposite conductivity type current mirror circuit means, and said first and second control signal terminals for enabling transfer of control signals from said loop terminals to said first and second control signal terminals.

12. The combination of claim 10 wherein said third resistance element includes a photoresistive element, and further including radiation emitting means coupled between said input terminal of said second one of said first conductivity type current mirror circuit means and said output terminal of said opposite conductivity type current mirror circuit means, so that the resistance of said photoresistive element varies in accordance with the intensity of the radiation emitted by said radiation emitting means.

13. The combination of claim 10 further including a plurality of unidirectional conducting devices coupled to said first and second loop terminals and said second terminals of said first and second resistance elements for maintaining current flow through said loop terminals unidirectional.

14. A direct coupled hybrid circuit for providing signal conversion between a balanced bidirectional transmission path and a pair of unbalanced bidirectional transmission paths, said pair including an incoming an an outgoing path, said hybrid circuit comprising:

first and second loop terminals;
first and second unidirectional terminals;
a first plurality of current mirror circuit means of a first conductivity type;
a second plurality of current mirror circuit means of an opposite conductivity type;
each of said current mirror circuit means having an input terminal, at least one output terminal, a supply voltage terminal and means for supplying a current to said output terminal proportional to the current at said input terminal;
first and second resistance elements;
a first terminal of said first resistance element being coupled to the input terminal of a first one of said first conductivity type current mirror circuit means;
a first terminal of said second resistance element being coupled to the input terminal of a first one of said opposite conductivity type current mirror circuit means;
a second terminal of said first and second resistance elements being coupled respectively to said first and second loop terminals;
the output terminal of said first and a second one of said first conductivity type current mirror circuit means being coupled to said second unidirectional terminal;
the input terminal of said second current mirror circuit means of said first conductivity type being coupled to the output terminal of said first one of said plurality of opposite conductivity type current mirror circuit means;

a first transistor having a base coupled to said first unidirectional terminal, a collector coupled to the input terminal of the third one of said plurality of first conductivity type current mirror circuit means, and an emitter;
a third resistance element having a first terminal coupled to said emitter and a second terminal coupled to the input terminal of a second one of said plurality of opposite conductivity type current mirror circuit means;
the output terminal of said second one of said plurality of opposite conductivity type current mirror circuit means being coupled to said second loop terminal;
the output terminal of said third one of said plurality of first conductivity type current mirror circuit means being coupled to said first loop terminal;
a second transistor having a collector coupled to said input terminal of said second one of said plurality of first conductivity type current mirror circuit means, an emitter, and a base coupled to the base of said first transistor; and
a fourth resistance element having a first terminal coupled to said emitter of said second transistor and a second terminal coupled to said supply voltage terminal of at least one of said second conductivity type current minor circuit means.

15. The combination of claim 14 wherein said third resistance element is adjustable.

16. The combination of claim 14 wherein said fourth resistance element includes a variable resistance element having a control terminal, and further including means coupled to said second loop terminal for providing a bias voltage to said control terminal whose magnitude is dependent upon the quantity of current flowing in said second loop terminal.

17. The combination of claim 14 further including a plurality of unidirectional conducting devices coupled to said loop terminals and said second terminal of said first and second resistance elements for maintaining current flow through said loop terminals unidirectional.

18. A system for enabling transmission of information signals between a pair of bidirectional transmission paths, said system comprising:

a transmission link having first and second unidirectional transmission paths; and
first and second hybrid circuit means each coupled to a different end of said transmission link by means of first and second unidirectional terminal means, and each coupled to a different one of said bidirectional transmission paths by means of loop terminal means;
each said hybrid circuit means including a plurality of current mirror circuit means for coupling balanced signals appearing on said loop terminal means to said second unidirectional terminal means and for coupling incoming signals on said first unidirectional terminal means to said loop terminal means, said current mirror circuit means connected to suppress longitudinal mode signals appearing on said loop terminal means, and provide signal balance between said first unidirectional terminal means and said second unidirectional terminal means to prevent signal reflections along said transmission link.

19. The system of claim 18 wherein said transmission link further includes a control signal transmission path; and wherein one of said hybrid circuit means includes control signal terminal means coupled to said control signal transmission path, and means coupled to said loop terminal means and said control signal terminal means for coupling control signals from the associated one of said bidirectional transmission paths to said control signal transmission path.

20. The system of claim 18 wherein one of said hybrid circuit means includes a plurality of unidirectional conducting devices coupled to the associated one of said bidirectional transmission paths and said current mirror circuit means for maintaining current flow through said associated bidirectional transmission path unidirectional.

* * * * *

UNITED STATES PATENT OFFICE
CERTIFICATE OF CORRECTION.

Patent No. 4,004,109          Dated January 18, 1977

Inventor(s) Frank S. Boxall

It is certified that error appears in the above-identified patent and that said Letters Patent are hereby corrected as shown below:

Col. 2;line 53, substitute "hybrid" for "hybride"; Col. 5, line 9, substitute "$r_c$" for "$r_o$"; Col. 5, line 58, substitute "and" for "nd"; Col. 6, line 31, substitute "lower" for "lowwer"; Col. 6, line 39, substitute "each having an input" for "ech having an imput"; Col. 6, line 64, substitute "40, 43" for "10, 43"; Col. 6, line 68, substitute "IR + $I_3 r_o$ = V-2   (1)" for "IR + $I_3 r_o$ = v-2   (1); Col. 7, line 25, substitute "V = 50 volts" for "V32 50 volts"; Col. 7, line 30, substitute "supra) I = 23 ma." for "supra) = 23 ma."; Col. 7, line 33, substitute "hybrid" for "hybride"; Col. 7, line 37, substitute "should" for "whould"; Col. 7, line 51, substitute "$\overline{i_1} = 2f\overline{i}$   (5)" for "$\overline{i_1} = 2f\overline{i}$ "; Col. 8, line 18, substitute "(hybrid)" for "(hybride)"; Col. 8, line 18, substitute "$\overline{i_r}/\overline{i_m} = \rho = (r-r_o)/(r+r_o)$" for "$i_4/\overline{i_m} = \rho = (r-r_o)(r+r_o)$"
Col. 8, line 21, substitute "from" for "form"; Col. 8, line 23, substitute "so $\overline{i_{1r}} = -2f\overline{i_r} = -2f\rho \overline{i_m}$
             $= -2f\rho(c/2)\overline{i_2} = -\rho g \overline{i_2}$
for " 50 $\overline{i_{1r}} = -2f\overline{i_4} = 2fo\overline{i_m} = -2f\rho \overline{i_2} = \rho q \overline{i_2}$

UNITED STATES PATENT OFFICE
CERTIFICATE OF CORRECTION

Patent No. 4,004,109  Dated January 18, 1977

Inventor(s) Frank S. Boxall

It is certified that error appears in the above-identified patent and that said Letters Patent are hereby corrected as shown below:

Col. 8, line 37, substitute "dial" for "idal"; Col. 8, line 43, substitute "particular" for "particulr"; Col. 8, line 50, substitute "control" for "conrol"; Col. 10, line 5, substitute:

$$\bar{i}_{1r} = f(2\bar{i} - \bar{i}_4) + \bar{i}_4 = 2f\bar{i} + (1-f)\bar{i}_4 = \left(\frac{2f}{r+r_o} - \frac{1-f}{r_4}\right)\bar{v}_2 \quad (10)$$

for:

$$\bar{i}_{1r} = f(2\bar{i} - \bar{i}_4) + \bar{i}_4 = 2f\bar{i} + (1-f)\bar{i}_1 = \left(\frac{2f}{r+r_o} \quad \frac{1-f}{r_4}\right)\bar{v}_2 \quad (10)$$

Col. 4, line 48, substitute " $=\rho\, i_m$ where $i_m$ is the" for " $=\rho\, i_m$ is the".

Signed and Sealed this

Twenty-third Day of May 1978

[SEAL]

Attest:

RUTH C. MASON  
Attesting Officer

LUTRELLE F. PARKER  
Acting Commissioner of Patents and Trademarks